United States Patent
Bower, III et al.

(10) Patent No.: US 8,978,024 B2
(45) Date of Patent: Mar. 10, 2015

(54) FEDERATED SYSTEM AUTOMATIC UPDATE COMMUNICATION TO ENABLE SELECTIVE UPDATE OF CRITICAL FIRMWARE ELEMENTS

(75) Inventors: Fred Bower, III, Durham, NC (US); Shun Rong Hu, Shanghai (CH); William G. Pagan, Durham, NC (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 146 days.

(21) Appl. No.: 13/565,762

(22) Filed: Aug. 2, 2012

(65) Prior Publication Data
US 2014/0040875 A1    Feb. 6, 2014

(51) Int. Cl.
*G06F 9/445* (2006.01)
(52) U.S. Cl.
USPC ........... 717/169; 717/168; 717/170; 717/173; 717/175; 717/178
(58) Field of Classification Search
None
See application file for complete search history.

(56) References Cited

U.S. PATENT DOCUMENTS

| | | | |
|---|---|---|---|
| 6,360,362 B1 | 3/2002 | Fichtner et al. | |
| 6,904,457 B2 | 6/2005 | Goodman | |
| 7,051,327 B1* | 5/2006 | Milius et al. | 717/177 |
| 7,055,148 B2 | 5/2006 | Marsh et al. | |
| 7,260,818 B1* | 8/2007 | Iterum et al. | 717/170 |
| 8,543,665 B2* | 9/2013 | Ansari et al. | 709/218 |
| 2002/0092010 A1* | 7/2002 | Fiske | 717/168 |
| 2003/0217357 A1 | 11/2003 | Parry | |
| 2006/0070055 A1* | 3/2006 | Hodder et al. | 717/168 |
| 2008/0189693 A1* | 8/2008 | Pathak | 717/168 |
| 2008/0301668 A1* | 12/2008 | Zachmann | 717/173 |
| 2008/0320110 A1* | 12/2008 | Pathak | 709/220 |
| 2009/0150878 A1* | 6/2009 | Pathak et al. | 717/172 |
| 2009/0187900 A1* | 7/2009 | Nakamoto | 717/168 |
| 2009/0265736 A1* | 10/2009 | Son | 725/37 |
| 2009/0271507 A1* | 10/2009 | Kodimer | 709/224 |
| 2010/0146497 A1* | 6/2010 | Kogan et al. | 717/170 |
| 2010/0169876 A1* | 7/2010 | Mann | 717/170 |
| 2010/0241748 A1* | 9/2010 | Ansari et al. | 709/225 |
| 2010/0281474 A1 | 11/2010 | Eason et al. | |

(Continued)

OTHER PUBLICATIONS

IBM, "A Request Mechanism With It's Method for the Firmware to Query Deployed Firmware Version and Automatically . . . ," IP.com Prior Art Database, 2008.

(Continued)

*Primary Examiner* — Issac T Tecklu
(74) *Attorney, Agent, or Firm* — Steven M. Greenberg, Esq.; CRGO Law

(57) ABSTRACT

A method for firmware update coordination in a federated computing system can include receiving in a host one of different computers coupled to one another in a federated computing system, different version levels of firmware versions in peer ones of the different computers. The method additionally can include recording in a compatibility list in the host computer, different version levels of firmware versions for respectively different peer ones of the computers. The method yet further can include selecting a firmware update to be applied to the host computer and comparing a version level of the selected firmware update to the different version levels in the compatibility list. Finally, the firmware update can be applied to the host computer only if the version level of the selected firmware update is present in the compatibility list, but otherwise rejecting the firmware update.

18 Claims, 2 Drawing Sheets

(56) References Cited

U.S. PATENT DOCUMENTS

| | | | |
|---|---|---|---|
| 2011/0072423 A1* | 3/2011 | Fukata | 717/172 |
| 2011/0107323 A1* | 5/2011 | Hong | 717/173 |
| 2011/0173604 A1 | 7/2011 | Nakamura et al. | |
| 2011/0176456 A1* | 7/2011 | Tamura | 370/254 |
| 2012/0278795 A1* | 11/2012 | Bouchier et al. | 717/170 |
| 2013/0036414 A1* | 2/2013 | Birtwhistle et al. | 717/173 |
| 2013/0036415 A1* | 2/2013 | Birtwhistle | 717/173 |
| 2013/0074061 A1* | 3/2013 | Averbuch et al. | 717/171 |

OTHER PUBLICATIONS

Ajmani, S., "Automatic Software Upgrades for Distributed Systems," Dissertations Abstracts International, 6601B, 354, 2004.

* cited by examiner

FEDERATED SYSTEM AUTOMATIC UPDATE COMMUNICATION TO ENABLE SELECTIVE UPDATE OF CRITICAL FIRMWARE ELEMENTS

BACKGROUND OF THE INVENTION

1. Field of the Invention

The present invention relates to the field of federated computing systems and more particularly to firmware updating computer systems within a federated architecture.

2. Description of the Related Art

A federated system is a collection of independent, cooperative, possibly heterogeneous and autonomous computer systems which allows sharing all or some of its data. The term "multi-enclosure system" or the term "multiple enclosure system" is more descriptive of the physical predominance in a federated computing environment in which physically separate computers are linked together as one system where each of the computers enjoys its own external casing or enclosure and each computer is coupled to another through a configured communicative linkage over which coordinative actions can occur with respect to all of the computers in the federated system.

Federated systems address the popular requirement of cooperation between independent computing systems in order to share data and provide new functionalities to the users. In this regard, a federated system coordinates the cooperation between different computers to provide a unified view of those computers to different users. Three properties characterize a federated computing system: distribution in that data and processing are distributed across different computing systems, autonomy in that each computing system operates independently at a cooperative level chosen by each computing system, and heterogeneity in that there can be different types of computing systems federated within the federated computing system.

In federated computing systems, multiple firmware images, specifically one image per computer, must coordinate the initial sequencing of the federated computing system. In order to properly coordinate this sequencing, the computers of the federated computing system must share matching sets of firmware. This firmware is therefore considered critical to the successful initialization of a federated system. A common problem occurs when flash updating firmware on different computers of a federated computing system. In this regard, when a particular computing system fails to update with its peers, the result is a computer system that will no longer initialize in its federated configuration. Presently, the end user will be alerted in most cases to this failure, however, to avoid such a circumstance, an external management controller or end user must interact with each of the computing systems to resolve proper firmware levels to be applied to each computer system in the federated system.

BRIEF SUMMARY OF THE INVENTION

Embodiments of the present invention address deficiencies of the art in respect to firmware updating in a federated computing system and provide a novel and non-obvious method, system and computer program product for firmware update coordination in a federated computing system. In an embodiment of the invention, a method for firmware update coordination in a federated computing system can include receiving in a host one of different computers coupled to one another in a federated computing system, different version levels of firmware versions in peer ones of the different computers. The method additionally, can include recording in a compatibility list in the host one of the different computers, different version levels of firmware versions for respectively different ones of the peer ones of the computers. The method yet further can include selecting a firmware update to be applied to the host one of the different computers and comparing a version level of the selected firmware update to the different version levels in the compatibility list. Finally, the method can include applying the firmware update to the host one of the different computers only if the version level of the selected firmware update is present in the compatibility list, but otherwise rejecting the firmware update.

In one aspect of the embodiment, the firmware update is applied to the host one of the different computers irrespective of the presence of the version level of the selected firmware update in the compatibility list when the host one of the different computers has been configured to accept all firmware updates. For example, the host one of the different computers can be configured to accept all firmware updates when a version level of a firmware version of the host one of the different computers matches version levels of other firmware versions of others of the peer ones of the different computers. In another aspect of the embodiment, the firmware update is applied to the host one of the different computers only if the version level of the selected firmware update is present in the compatibility list and satisfies at least one update policy specifying when a firmware update is permitted to be applied according to a version level of the firmware update, but otherwise rejecting the firmware update. In yet another aspect of the embodiment, the firmware update is selected according to whether a version level of the firmware update is present in the compatibility list.

In another embodiment of the invention, a federated computing system can be configured for firmware update coordination. The system can include different computers coupled to one another with a communications pathway to form the federated computing system. Each of the computers can include memory and at least one processor and a compatibility list disposed in the memory. The compatibility list can include different entries corresponding to different version levels of firmware for different peer ones of the computers. Finally, a coordinated firmware update module can execute in the memory and can include program code enabled to select a firmware update to be applied internally, to compare a version level of the selected firmware update to the different version levels in the compatibility list, and to apply the firmware update internally only if the version level of the selected firmware update is present in the compatibility list, but otherwise rejecting the firmware update.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for firmware update coordination in a federated computing system. In accordance with an embodiment of the invention, a federated computing system can be established through the coupling of the computers through cabling. Each computer in the federated computing system can self-configure either to receive any firmware update, or to receive only a firmware update included in a list of compatible updates retrieved by the computer from other computers in the federated computing system through the cabling. Thereafter, during a firmware update of each computer in the federated computing system, each computer can police the application of the firmware update based upon whether the computer has been preconfigured to receive any firmware update or only firmware updates in the list of compatible updates.

Figure 1:
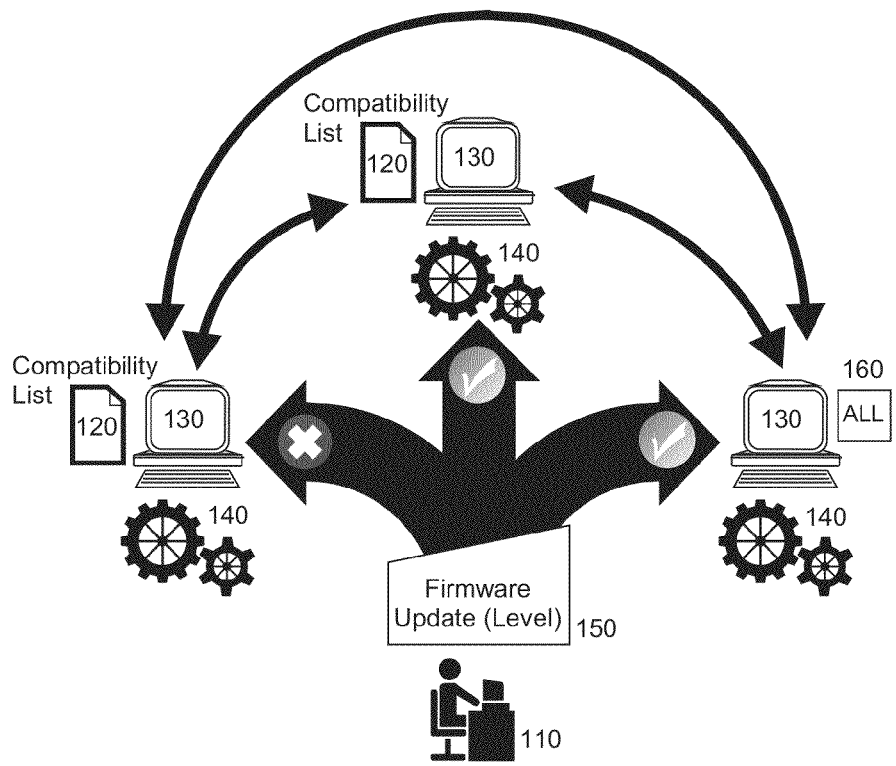
FIG. 1 is a pictorial illustration of a process for firmware update coordination in a federated computing system.

In further illustration, FIG. 1 is a pictorial illustration of a process for firmware update coordination in a federated computing system. As shown in FIG. 1, different computers 130 of a federated computing system can be linked to one another in order to exchange firmware version level data with one another. To the extent that the version level for one computer 130 differs from that of its peers, a compatibility list 120 can be constructed for the one computer 130 representative of the version levels of the peers requisite to enjoy continued compatibility within the federated computing system. Otherwise, to the extent that a given one of the computers 130 has a firmware version level consistent with the discovered version levels of its peers, an "accept all" parameter 160 can be established for the computer 130 so as to accept all subsequent firmware updates irrespective of a version level of the firmware update.

Thereafter, when an administrator 110 attempts to apply a firmware update 150 to the computers 130 of the federated computing system, coordinated firmware update logic 140 in each of the computers 130 first can determine if the "accept all" parameter 160 has been set and if so, the firmware update 150 can be applied to the host one of the computers 130. Otherwise, the coordinated firmware update logic 140 can compare a firmware level for the host one of the computers 130 to the compatibility list 120 to determine whether or not the firmware update 150 has been listed as compatible. If so, the firmware update 150 can be applied to the host one of the computers 130. Otherwise, the firmware update 150 can be rejected.

Figure 2:
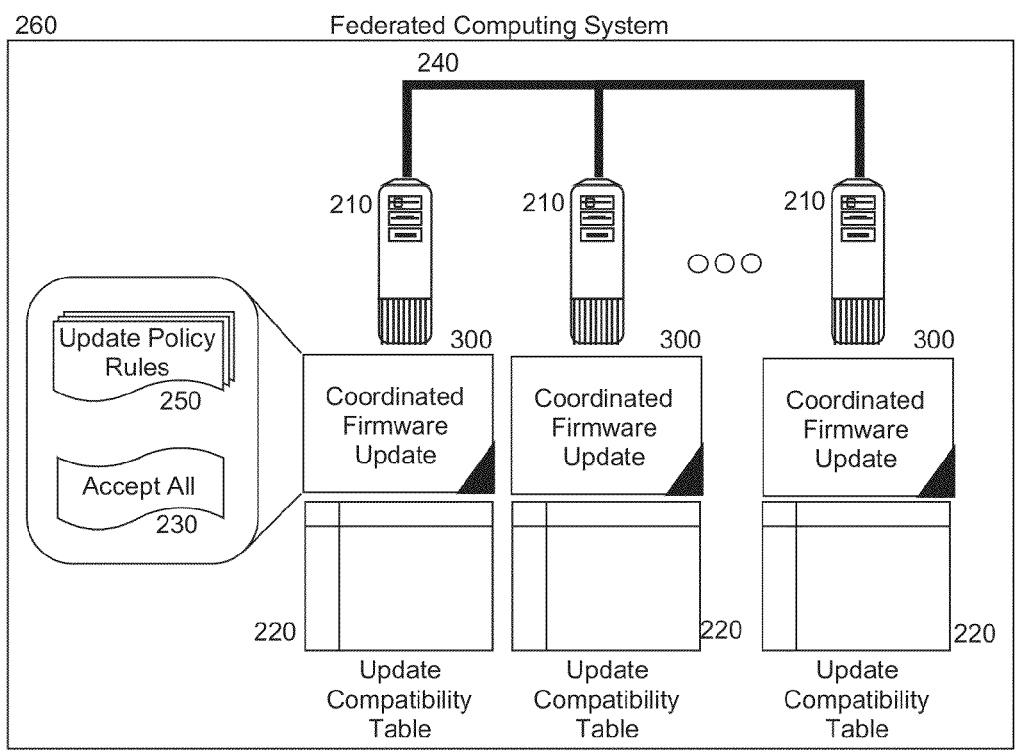
FIG. 2 is a schematic illustration of a federated computing system configured for firmware update coordination; and, FIG. 3 is a flow chart illustrating a process for firmware update coordination in a federated computing system.

The process described in connection with FIG. 1 can be implemented in a federated computing system. In yet further illustration, FIG. 2 schematically shows a federated computing system 260 configured for firmware update coordination. The federated computing system 260 system can include different computers 210 coupled to one another with a common communications pathway 240, such as a set of cables or a common bus. Each of the computers 210 can include a coordinated firmware update module 300 executing in memory therein.

The coordinated firmware update module 300 can include program code that when executed in the memory of a host one of the computers 210 can determine whether or not a current firmware level for the host one of the computers 210 matches that of the peer one of the computers 210. If so, the program code of the module 300 can set an accept all flag 230. Otherwise, the program code of the module 300 can construct an update compatibility table 220 listing the different firmware version levels for peer ones of the computers 210. Optionally, one or more update policy rules 250 can be managed by the program code of the module 300 including rules indicating when a proposed firmware update is permitted to be applied to the host one of the computers 210.

In operation, the program code of the coordinated firmware update module 300 can process a request to apply a firmware update to a host one of the computers 210 initially by determining if the accept all flag 230 has been set. If so, the program code of the coordinated firmware update module 300 can permit the application of the proposed firmware update to the host one of the computers 210. Otherwise, the program code of the coordinated firmware update module 300 can compare the version level of the proposed firmware update to the different entries of the update compatibility table 220.

To the extent the proposed firmware update has a version level listed in the updated compatibility table 230, the program code of the coordinated firmware update module 300 can permit the application of the proposed firmware update to the host one of the computers 210. Alternatively, one or more of the update policy rules 250 can be compared to the version level of the proposed firmware update and, if permitted by the update policy rules 250, the program code of the coordinated firmware update module 300 can permit the application of the proposed firmware update to the host one of the computers 210. Otherwise, the program code of the coordinated firmware update module 300 can reject the proposed firmware update.

Figure 3:
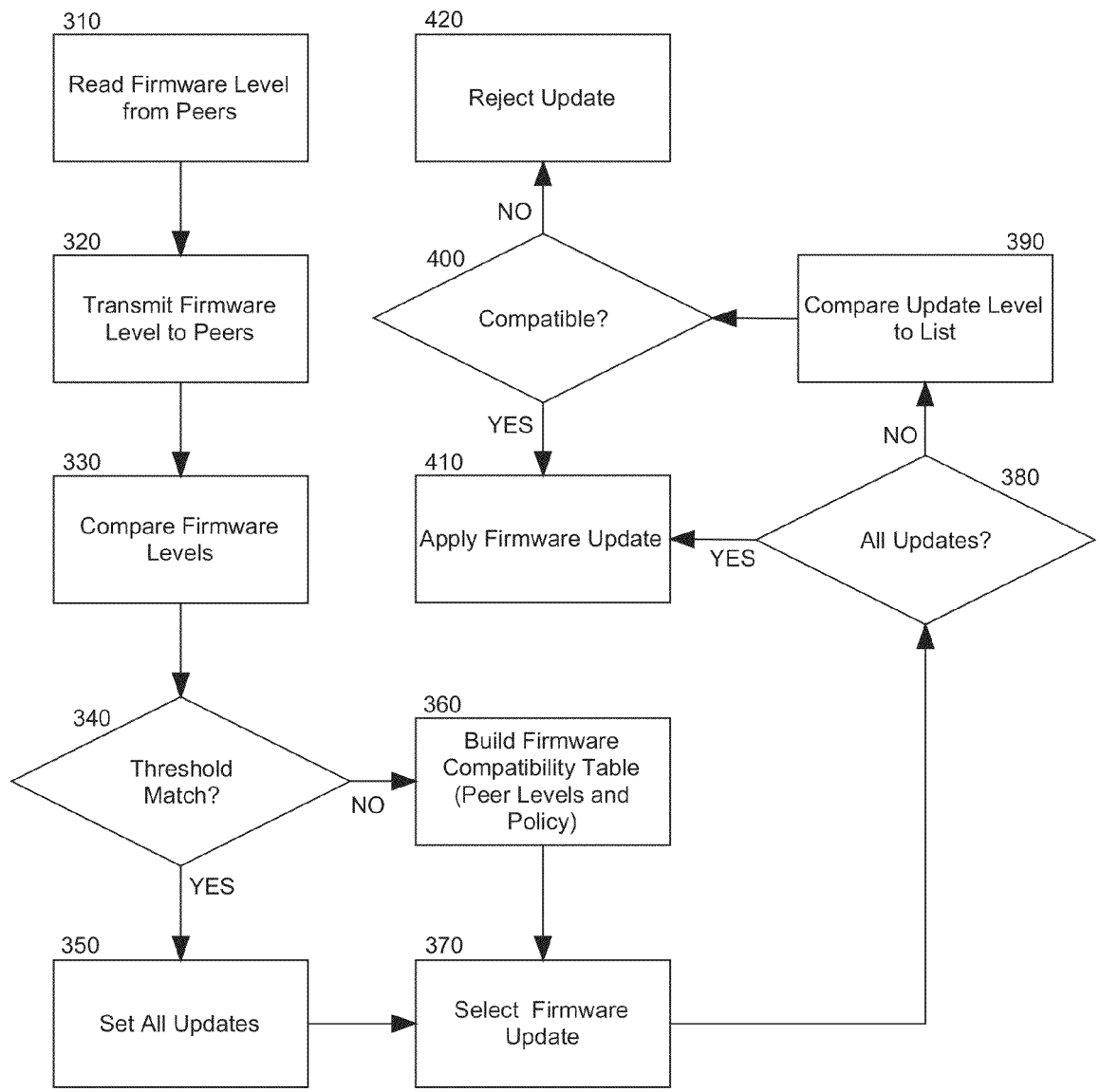

In even yet further illustration of the operation of the update compatibility table 220, FIG. 3 is a flow chart illustrating a process for firmware update coordination in a federated computing system. Beginning in block 310, the firmware levels of different peer computers can be read into memory, for example each of the peer computers can be queried over the communications pathway coupling the different computers to one another, or a host one of the computers can listen for published firmware level data on the communications pathway. Similarly, in block 320 the firmware version level for the host one of the computers can be published to the peer computers over the communications pathway.

In block 330, the firmware levels for the peer computers can be compared to that of the host one of the computers. In decision block 340, if a threshold number of the firmware version levels for the peer computers match that of the host one of the computers, in block 350 the all updates flag can be set indicating that any superseding update will be compatible and thus permissible. Otherwise, in block 360 a firmware compatibility table can be constructed in the host one of the computers indicating those firmware levels of the peer computers. Optionally, one or more update policies can be recorded as well, such as only a firmware update with a version level equivalent to the highest version level in the compatibility table is permitted to be applied, to name only a single example.

In block 370, a firmware update can be selected for updating a host one of the computers. In this regard, the firmware update can be manually provided, or the firmware update of a particular version level can be proactively selected in consideration of the known permissible version levels in the compatibility table. In the former circumstance, in decision block 380 it can be determined whether or not the all updates flag has been set. If so, in block 410 the selected firmware update can be applied. Otherwise, in block 390 the version level of the selected firmware update can be compared to the compatibility list. In decision block 400, if the version level of the selected firmware update is present in the compatibility list, in block 410 the selected firmware update can be applied to the host one of the computers. Otherwise, in block 420 the selected firmware update can be rejected.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for firmware update coordination in a federated computing system, the method comprising:
   receiving in a host one of different computers coupled to one another in a federated computing system, different version levels of firmware versions in peer ones of the different computers each of from the peer ones of the different computers;
   recording in a compatibility list in the host one of the different computers, the different version levels of firmware versions for respectively different ones of the peer ones of the computers received from each of the peer ones of the different computers;
   selecting a firmware update to be applied to the host one of the different computers;
   comparing a version level of the selected firmware update to the different version levels in the compatibility list; and,
   applying the firmware update to the host one of the different computers only if the version level of the selected firmware update is present in the compatibility list, but otherwise rejecting the firmware update.

2. The method of claim 1, further comprising applying the firmware update to the host one of the different computers irrespective of the presence of the version level of the selected firmware update in the compatibility list when the host one of the different computers has been configured to accept all firmware updates.

3. The method of claim 1, wherein the firmware update is applied to the host one of the different computers only if the version level of the selected firmware update is present in the compatibility list and satisfies at least one update policy specifying when a firmware update is permitted to be applied according to a version level of the firmware update, but otherwise rejecting the firmware update.

4. The method of claim 1, wherein the firmware update is selected according to whether a version level of the firmware update is present in the compatibility list.

5. The method of claim 1, wherein the firmware update is selected according to whether a version level of the firmware update is present in the compatibility list and if the version level of the firmware update satisfies at least one update policy specifying when a firmware update is permitted to be applied according to a version level of the firmware update.

6. The method of claim 1, wherein the host one of the different computers is configured to accept all firmware updates when a version level of a firmware version of the host one of the different computers matches version levels of other firmware versions of others of the peer ones of the different computers.

7. A federated computing system configured for firmware update coordination, the system comprising:
   a plurality of computers coupled to one another with a communications pathway to form the federated computing system, each of the computers comprising:
   memory and at least one processor;
   a compatibility list disposed in the memory, the compatibility list comprising different entries corresponding to different version levels of firmware for different peer ones of the computers received from each of the peer ones of the different computers; and,
   a coordinated firmware update module executing in the memory, the module comprising program code enabled to receive from each of the peer ones of the different computers different version levels of firmware, to update the compatibility list with the received different version levels, to select a firmware update to be applied internally, to compare a version level of the selected firmware update to the different version levels in the compatibility list, and to apply the firmware update internally only if the version level of the selected firmware update is present in the compatibility list, but otherwise rejecting the firmware update.

8. The system of claim 7, further comprising applying the firmware update internally irrespective of the presence of the version level of the selected firmware update in the compatibility list when internally it has been determined to accept all firmware updates.

9. The system of claim 7, wherein the firmware update is applied only if the version level of the selected firmware update is present in the compatibility list and satisfies at least one update policy specifying when a firmware update is permitted to be applied internally according to a version level of the firmware update, but otherwise rejecting the firmware update.

10. The system of claim 7, wherein the firmware update is selected according to whether a version level of the firmware update is present in the compatibility list.

11. The system of claim 7, wherein the firmware update is selected according to whether a version level of the firmware update is present in the compatibility list and if the version level of the firmware update satisfies at least one update policy specifying when a firmware update is permitted to be applied internally according to a version level of the firmware update.

12. The system of claim 7, wherein it is determined internally to accept all firmware updates when a version level of an internal firmware version matches version levels of other firmware versions of others of the computers.

13. A computer program product for firmware update coordination in a federated computing system, the computer program product comprising:
   a non-transitory computer readable storage medium having computer readable program code embodied therewith, the computer readable program code comprising:
   computer readable program code for receiving in a host one of different computers coupled to one another in a federated computing system, different version levels of firmware versions in peer ones of the different computers from each of the peer ones of the different computers;
   computer readable program code for recording in a compatibility list in the host one of the different computers, different version levels of firmware versions for respectively different ones of the peer ones of the computers received from each of the peer ones of the different computers;

computer readable program code for selecting a firmware update to be applied to the host one of the different computers;

computer readable program code for comparing a version level of the selected firmware update to the different version levels in the compatibility list; and, computer readable program code for applying the firmware update to the host one of the different computers only if the version level of the selected firmware update is present in the compatibility list, but otherwise rejecting the firmware update.

14. The computer program product of claim 13, further comprising computer readable program code for applying the firmware update to the host one of the different computers irrespective of the presence of the version level of the selected firmware update in the compatibility list when the host one of the different computers has been configured to accept all firmware updates.

15. The computer program product of claim 13, wherein the firmware update is applied to the host one of the different computers only if the version level of the selected firmware update is present in the compatibility list and satisfies at least one update policy specifying when a firmware update is permitted to be applied according to a version level of the firmware update, but otherwise rejecting the firmware update.

16. The computer program product of claim 13, wherein the firmware update is selected according to whether a version level of the firmware update is present in the compatibility list.

17. The computer program product of claim 13, wherein the firmware update is selected according to whether a version level of the firmware update is present in the compatibility list and if the version level of the firmware update satisfies at least one update policy specifying when a firmware update is permitted to be applied according to a version level of the firmware update.

18. The computer program product of claim 13, wherein the host one of the different computers is configured to accept all firmware updates when a version level of a firmware version of the host one of the different computers matches version levels of other firmware versions of others of the peer ones of the different computers.

\* \* \* \* \*